United States Patent

Schellgell et al.

[15] 3,641,918
[45] Feb. 15, 1972

[54] AUTOMATIC COFFEE DISPENSER

[72] Inventors: George M. Schellgell, 14600 Westover Road, Elm Grove, Wis. 53122; Ward J. Torke, 630 South 26th Street, Sheboygan, Wis. 53081

[22] Filed: Nov. 28, 1969

[21] Appl. No.: 880,753

[52] U.S. Cl. ................................................99/279, 99/300
[51] Int. Cl. ..........................................................A47j 31/00
[58] Field of Search....................99/275, 289, 300, 302, 279, 99/299, 307

[56] References Cited

UNITED STATES PATENTS

| | | | |
|---|---|---|---|
| 2,682,984 | 7/1954 | Melikian | 99/275 |
| 2,802,599 | 8/1957 | Callahan | 99/289 |
| 3,011,426 | 12/1961 | Mueller | 99/289 X |
| 3,446,137 | 5/1969 | Pryor | 99/289 |

*Primary Examiner*—Robert W. Jenkins
*Attorney*—James E. Nilles

[57] ABSTRACT

A coffee dispensing apparatus including a refrigerating chamber for a liquid coffee concentrate; a water heater having a float controlled solenoid for maintaining a predetermined level of water within said water heater; a coffee concentrate dispensing line extending through said water heater to a mixing bowl, a pump for pumping concentrate to the mixing bowl, a hot waterline from the water heater to the mixing bowl and a solenoid valve to control the discharge of hot water from said water heater. An electrical circuit including a pair of timing cams is provided for sequentially discharging a predetermined amount of coffee concentrate and hot water into the mixing bowl to produce a single cup of coffee at a time.

8 Claims, 2 Drawing Figures

PATENTED FEB 15 1972

3,641,918

Inventors:
George M. Schellgell
Ward J. Torke

By: James E. Nilles
Attorney

AUTOMATIC COFFEE DISPENSER

BACKGROUND OF THE INVENTION

Numerous coffee dispensing systems have been designed for dispensing one cup of coffee at a time. Many of these systems use instant coffee and are objectionable either because of the stale or flat flavor of the coffee, or because of improper mixing of coffee when discharged into the cup. The instant coffee is wetted with sufficient water to be flowable and is then dispensed into the cup and the hot water added to fill the cup. Some attempt has been made to brew a fresh cup of coffee each time a cup is to be dispensed, however, these systems have become unusually complicated requiring periodic maintenance. If coffee is brewed and allowed to stand for any length of time, it tends to oxidize becoming stale and often bitter.

SUMMARY OF THE INVENTION

The dispensing apparatus of the present invention uses a liquid coffee concentrate for the basic coffee flavor. The concentrate is formed from a blend of coffee, brewed in a minimum amount of water and the resulting concentrate then quick frozen for storage. The frozen concentrate is then thawed and maintained under refrigeration until it is dispensed into the cup. By maintaining the coffee concentrate at a temperature of 37° to 40° until it is actually dispensed, the tendency to oxidize is eliminated and the flavor of the coffee is maintained.

It has also been found that by heating the refrigerated coffee concentrate just prior to being mixed with hot water and dispensed into the cup, the flavor is enhanced. This is accomplished, for example, by circulating the coffee concentrate through the hot water heater prior to mixing with the hot water.

Other objects and advantages of the present invention will appear hereinafter as this disclosure progresses, reference being had to the accompanying drawings.

DESCRIPTION OF THE INVENTION

Figure 1:
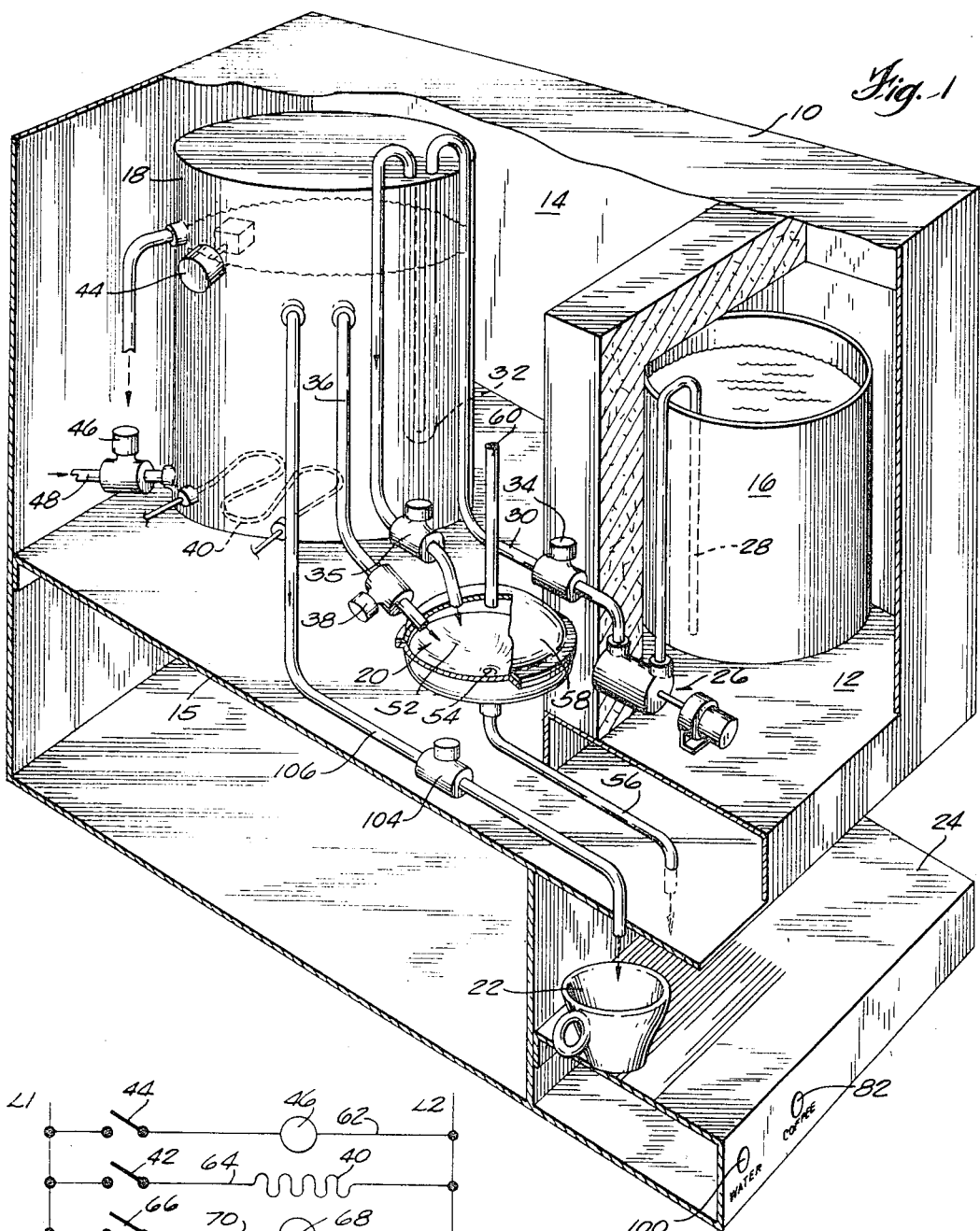
FIG. 1 is a perspective view of the automatic coffee dispensing apparatus.

The automatic coffee dispensing apparatus of this invention generally includes a housing 10 having a refrigeration chamber 12 and a storage chamber 14. A container 16 for a liquid coffee concentrate is positioned within the refrigerating chamber 12 and an automatic water heater 18 is positioned on the shelf 15 in the storage chamber 14. Coffee concentrate from the container 16 and hot water from the heater 18 are sequentially dispensed into a mixing bowl or chamber 20 and allowed to flow into a cup 22 placed on a supporting shelf 24. The coffee concentrate is dispensed first into the mixing chamber 20 and the hot water added immediately thereafter to achieve a thorough mixing of the concentrate and water as it flows into the cup 22.

More particularly, coffee concentrate which has been previously frozen is thawed and placed in the container 16 where the temperature of the concentrate is maintained between 37°–40° F. The concentrate is dispensed from the container 16 by means of a positive displacement pump 26 connected to the container 16 by a suction line 28 and is pumped into the mixing bowl 29 through a line 30. The coffee concentrate is heated by means of a coil section 32 provided in the hot water heater 18. A solenoid valve 34 can be provided in the line 30 to prevent any siphoning action from occurring in the line 30 after a predetermined amount of concentrate has been dispensed into the mixing chamber 20. A second solenoid 35 is provided near the discharge end of line 30 to provide positive shut off and thereby eliminate any dripping.

Figure 2:
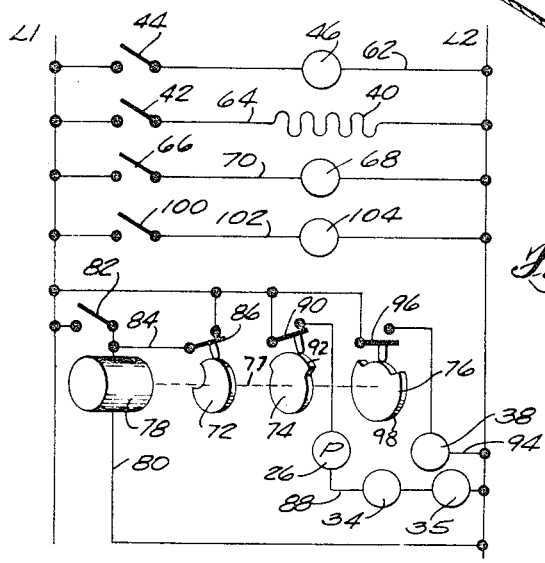
FIG. 2 a circuit diagram of the timing system used to control the operation of the apparatus.

Hot water is dispensed from the hot water heater 18 through a line 36 connected to the mixing bowl 20 and controlled by a solenoid valve 38. The line 36 is connected to the water heater 18 near the top of the container in order to use the hottest water available in the container 18. The water in the container is maintained at a temperature of 185° to 190° F. by means of a coil 40 controlled by a temperature control switch 42 as seen in FIG. 2.

The water level in the water heater 18 is maintained by means of a float control switch 44 located near the top of the container and a solenoid valve 46 provided in a water inlet line 48 connected to a conventional source of water. The float control switch 44 is connected to the solenoid valve 46 and maintains a constant water level in the container. An overflow tube 50 is provided near the top of the container in the event of a malfunction of the float control switch 44.

The coffee concentrate and the hot water are mixed within the mixing bowl 20 which is provided with a downwardly sloped surface 52 having an outlet opening 54 connected to a dispensing line 56. The mixing bowl is closed by means of a cover 58 to prevent contamination of the mixing bowl. The pressure within the chamber is relieved by means of a pressure relief tube 60 which projects vertically upward from the cover 58.

Generally, approximately a half ounce of liquid concentrate is dispensed into the mixing bowl and 5½ ounces of hot water is mixed with the concentrate to produce the coffee. The concentrate is normally at a temperature of approximately 40° when it is in the refrigerating chamber and is raised to a temperature of approximately 110° when it passes through the heater coil section 32 in the hot water heater 18. Raising the temperature of the coffee concentrate prior to mixing with the hot water not only enhances the flavor of the concentrate, but also assures that hot coffee is dispensed into the cup.

Referring to FIG. 2, a circuit diagram is shown for sequentially dispensing liquid coffee concentrate and hot water from the automatic coffee dispenser. The dispenser can be connected to a conventional 110 volt power source through power leads L1 and L2. The float valve 44 and solenoid 46 are connected across the lines L1 and L2 by a circuit 62. The heater coil 40 and temperature switch 42 are connected across leads L1 and L2 by a circuit 64. The motor 68 for the refrigeration system is connected to a temperature control switch 66 and across the leads L1 and L2 by a circuit 70. These are all conventional circuit connections and need no further explanation.

Sequential dispensing of the liquid coffee concentrate and the hot water is controlled by means of a timing circuit assembly which includes a number of cams 72, 74 and 76 secured to the drive shaft 77 of an electric motor 78. The motor 78 is connected across powerlines L1, L2 by a circuit 80 which includes a starter switch 82 to initate the operation of the motor 78. Means are provided for driving the motor 78 through a complete cycle in the form of a holding circuit 84 having a switch 86 positioned for actuation by cam 72.

Liquid coffee concentrate is dispensed by the motor 26 and solenoids 34 and 35 which are connected across lines L1 and L2 by a circuit 88 having a switch 90. The switch 90 is closed in the initial movement of cam 74. The length of time that the switch 90 is closed is determined by the length of lobe 92 which is adjustable to vary the amount of concentrate dispensed for each cup of coffee.

Hot water is dispensed by opening solenoid 38 which is connected across lines L1, L2 by a circuit 94 having a switch 96 positioned to be actuated by cam 76. The cam 76 is provided with a lobe 98 angularly displaced from the lobe 92 to start to dispense water near the end of the dispensing cycle for the coffee concentrate. The length of the lobe 98 can be adjusted to vary the amount of hot water dispensed into the cup.

Although a cam controlled time assembly has been disclosed, it should be understood that electric timers can also be used to control the operation of the pump 26 and solenoids 34, 35 and 38.

The dispenser can also be used to dispense hot water for making tea by means of a solenoid 104 connected in the line 102 to the hot water heater 18. The solenoid 104 is controlled by means of a starter switch 100 connected to the solenoid by a circuit 102. Closing of the switch 100 will open the solenoid 104 allowing hot water to flow directly into the cup.

RESUME

By means of the present invention, a coffee dispensing system is provided which can be used to dispense one serving of coffee having the flavor of fresh brewed coffee. The coffee concentrate is maintained under refrigeration up until the time for dispensing into the cup. The concentrate is heated prior to dispensing to reactivate the flavor of the coffee and to assure a hot cup of coffee.

What is claimed is:

1. An automatic coffee dispensing apparatus for dispensing a predetermined amount of coffee, said apparatus including
   a mixing bowl having an outlet conduit,
   a hot water heater,
   means for dispensing a predetermined amount of hot water from said heater to said mixing bowl,
   a container for liquid coffee concentrate,
   means for refrigerating said concentrate,
   means for dispensing a predetermined amount of concentrate into said mixing bowl,
   and means for preheating said concentrate prior to dispensing into said mixing bowl, whereby said combined predetermined amount of concentrate and water are sufficient for one serving.

2. An automatic coffee dispensing apparatus according to claim 1 wherein said concentrate is dispensed before said hot water.

3. An apparatus according to claim 1 wherein said preheating means include a coil section supported within said water heater.

4. An automatic coffee dispensing apparatus for dispensing coffee into a container, said apparatus comprising
   a housing having a refrigerating chamber and a mixing bowl,
   a liquid coffee concentrate container positioned within said refrigerating chamber for retaining liquid concentrate,
   a hot water heater for retaining hot water, and a mixing bowl having an outlet conduit positioned to dispense coffee into the container,
   means for dispensing a predetermined amount of liquid concentrate into said mixing bowl, means for preheating said liquid coffee concentrate prior to dispensing said concentrate into said mixing bowl, and means for dispensing a predetermined amount of hot water into said mixing bowl, the combined said predetermined amounts being sufficient for one serving.

5. An automatic coffee dispensing apparatus according to claim 4 wherein said concentrate dispensing means is actuated prior to said hot water dispensing means.

6. An automatic coffee dispensing apparatus according to claim 4 wherein said mixing bowl includes a cover having an air expansion tube.

7. An automatic coffee dispensing apparatus according to claim 4 wherein said preheating means includes a coil section positioned within said water heater.

8. An automatic coffee dispensing apparatus for dispensing coffee into a container, said apparatus comprising
   a housing for a refrigerating chamber,
   an enclosed mixing bowl positioned in said housing and including a downwardly inclined bottom wall and a drain in the bottom wall for discharging hot coffee to the container,
   means for relieving pressure within said enclosed mixing bowl,
   a liquid coffee concentrate container refrigerated in the housing of said coffee container,
   a hot water heater for retaining hot water,
   means for dispensing a predetermined amount of coffee into said mixing bowl, and
   means for dispensing a predetermined amount of hot water into said mixing bowl, the combined said predetermined amounts being directed by said downwardly inclined walls toward said drain and being sufficient for one serving.

* * * * *